(12) United States Patent
Jordan (10) Patent No.: US 8,413,994 B2
(45) Date of Patent: Apr. 9, 2013

(54) SEALING SYSTEM WITH PRESSURE RELIEF ELEMENTS AND USE OF A SEALING SYSTEM FOR PRODUCING A PRESSURE CASCADE IN AN INTERMEDIATE SPACE

(75) Inventor: Holger Jordan, Neuhausen (DE)

(73) Assignee: Trelleborg Sealing Solutions Germany GmbH, Stuttgart (DE)

( * ) Notice: Subject to any disclaimer, the term of this patent is extended or adjusted under 35 U.S.C. 154(b) by 0 days.

(21) Appl. No.: 12/224,213

(22) PCT Filed: Feb. 20, 2007

(86) PCT No.: PCT/DE2007/000317
§ 371 (c)(1),
(2), (4) Date: Aug. 21, 2008

(87) PCT Pub. No.: WO2007/095915
PCT Pub. Date: Aug. 30, 2007

(65) Prior Publication Data
US 2009/0066034 A1      Mar. 12, 2009

(30) Foreign Application Priority Data
Feb. 27, 2006   (DE) .......................... 10 2006 009 491

(51) Int. Cl.
*F16J 15/24*   (2006.01)
(52) U.S. Cl.
USPC ........................................ 277/552; 277/589
(58) Field of Classification Search .................. 277/552, 277/560, 589
See application file for complete search history.

(56) References Cited

U.S. PATENT DOCUMENTS

| 4,284,280 | A | * | 8/1981 | Bertram et al. | 277/558 |
| 4,458,717 | A | * | 7/1984 | Boland | 137/496 |
| 4,723,782 | A | * | 2/1988 | Muller | 277/589 |
| 4,953,876 | A | * | 9/1990 | Muller | 277/556 |
| 5,433,452 | A | * | 7/1995 | Edlund et al. | 277/589 |
| 6,290,235 | B1 | * | 9/2001 | Albertson | 277/510 |

(Continued)

FOREIGN PATENT DOCUMENTS

| DE | 32 07 327 | 9/1983 |
| DE | 36 20 539 | 12/1987 |

(Continued)

*Primary Examiner* — Gilbert Lee
(74) *Attorney, Agent, or Firm* — Paul Vincent (57) ABSTRACT

In a sealing system (1) between two mutually moving components (2, 3) for sealing a high pressure side (H) with respect to a low pressure side (N), a sealing configuration (9) is provided in a first annular groove (4) at the high pressure side and with one or more pressure relief elements (10a, 10b) being disposed in second annular grooves (14a, 14b) each pressure relief element (10a, 10b) having a second sealing ring (15a, 15b) with a flat pressure gradient. The hydrodynamic leak rate for each pressure relief element (10a, 10b) is chosen in such a fashion that a certain hydraulic pressure obtains in each intermediate region ($Z_a$, $Z_b$). The sealing system in accordance with the invention (1) has, in addition to the hydro dynamic transport capability of the sealing rings (5, 15a, 15b), a hydrostatic relief capability by means of connecting channels (17a, 17b) provided in the pressure relief elements (10a, 10b) which act as check valves for pressure relief of an intermediate region ($Z_b$) in the event of a rise in the intermediate region pressure above intermediate region pressure at the high pressure side of the next intermediate pressure region plus a corresponding pressure increase quantity (FIG. 2).

17 Claims, 2 Drawing Sheets

U.S. PATENT DOCUMENTS

| | | | |
|---|---|---|---|
| 6,595,524 B1 * | 7/2003 | Zitting | 277/436 |
| 7,083,170 B2 * | 8/2006 | Borstel et al. | 277/589 |
| 2002/0153665 A1 | 10/2002 | Borstel | |

FOREIGN PATENT DOCUMENTS

| | | |
|---|---|---|
| DE | 196 54 357 | 6/1998 |
| EP | 0 946 837 | 3/2003 |
| GB | 1 553 669 | 10/1979 |
| JP | 55-41620 | 3/1980 |
| JP | 62-100309 | 6/1987 |
| JP | 4-75203 | 6/1992 |
| JP | 4-88564 | 7/1992 |

* cited by examiner

SEALING SYSTEM WITH PRESSURE RELIEF ELEMENTS AND USE OF A SEALING SYSTEM FOR PRODUCING A PRESSURE CASCADE IN AN INTERMEDIATE SPACE

This application is the national stage of PCT/DE2007/000317 filed on Feb. 20, 2007 and also claims Paris Convention priority to DE 10 2006 009 491.3 filed on Feb. 27, 2006.

BACKGROUND OF THE INVENTION

The invention concerns a sealing system between two facing and mutually moving components for sealing a high-pressure side with respect to a low-pressure side. An outer component as an annular groove which opens towards the inner component and faces the low pressure side for acceptance of a sealing configuration as well as a second annular groove which opens towards the inner component and faces the high pressure side for acceptance of a pressure relief element. The sealing configuration includes a first sealing ring made from an elastically deformable material and a first preloading ring made from an elastic deformable material. The first sealing ring seats on the inner component and is tensioned in a radial direction by the first preloading ring, which also seals the first annular groove.

During operation of such sealing systems, i.e. during relative translational motion between the two components, a medium pressure increase in the intermediate spaces between the individual annular grooves and the elements provided therein can occur. This can be caused by disadvantageous velocity conditions associated with one component, for example a piston rod or a piston, in the associated installation space. In the event of disadvantageous velocity conditions between the seal and the opposing running surface, the hydrodynamic return transport properties of the seal can be insufficient to transport the resulting lubricant volume of the extending stroke back into the associated intermediate space. As a result of the accumulation of residual lubricant oil, a pressure increase can occur in the intermediate space, which can be multiples of the actual operating pressure. Such an increase in pressure can lead to damage or even rupturing of those components, thereby resulting in a breakdown in the entire system.

EP 0 946 837 discloses a pressure relief element which includes a sealing ring seating on an inner component and made from an elastically deformable material as well as a tensioning ring which radially surrounds the sealing ring, seals relative to the second annular groove, and is made from an elastically deformable material. A connecting channel in the sealing ring by means of which the high-pressure side and the low-pressure side can be connected to each other characterizes the pressure relief element. The connecting channel is closed by the sealing ring, which seals the high-pressure side relative to the low-pressure side and is opened when the pressure situation is inverted. A pressure relief element of this kind used in the above described sealing system serves as a kind of check valve which is opened as soon as the pressure $P_Z$ in the intermediate space between the sealing configuration and the pressure relief element exceeds a pressure $P_H$ on the high pressure side, $P_Z > P_H$. Through the opening of the connecting channel, the pressure in intermediate space can escape to the high pressure side. After relief, the pressure in the intermediate space is the same as that at the high-pressure side, $P_Z = P_H$.

It is the underlying purpose of the present invention to control the pressure relief of a sealing configuration within a sealing system in dependence on use such that pressure relief can first occur when the intermediate pressure is substantially larger than the high pressure, which is to be sealed.

SUMMARY OF THE INVENTION

This purpose is achieved in accordance with the invention in that the sealing system has one or more second annular grooves, wherein a pressure relief element is disposed in each of the respective second annular grooves which has a second sealing ring seating on the inner component and made from an elastically deformable material, as well as a second preloading ring which radially tensions the second sealing ring, which seals the second annular groove, and which is made from an elastically deformable material. Each pressure relief element has at least one associated connecting channel by means of which an intermediate space disposed between the sealing configuration and the first pressure relief element can be connected to the high pressure side or an intermediate space between two neighboring pressure relief elements can be connected to the high pressure side or two neighboring intermediate spaces can be connected to each other. Each connecting channel is closed when $P_{ZN} > P_H$ or $P_{ZN} > P_{ZH}$ and opens when $P_{ZN} \geq P_H + P_{crit}$ or when $P_{ZN} \geq P_{ZH} + P_{crit}$, wherein $P_H$ is the hydraulic pressure on the high pressure side, $P_{ZN}$ the hydraulic pressure in the low pressure intermediate space, $P_{ZH}$ the hydraulic pressure at the high pressure side of the intermediate space. $P_{crit}$ is a pressure increase value by which or upon exceeding thereof, leads to opening of the connecting channel.

In order to seal a system having two mutually moving components, a primary seal is brought into the sealing gap. The primary seal is the seal located in the first annular groove of the sealing configuration. In order to provide pressure relief of the primary seal, two annular grooves are provided on the high-pressure side having pressure relief elements. In the sealing system, the inner and outer components can be exchanged so that the first and second annular grooves as well as the inner and outer components can be provided in the inner or in the outer components. The configuration of one or more pressure relief elements on the high-pressure side has the advantage that the pressure on the high-pressure side does not directly load the primary seal. This is particularly advantageous in a configuration having a plurality of pressure relief elements disposed one behind the other.

In a sealing system having a sealing configuration with one or more pressure relief elements, one or more intermediate spaces are provided between one or more pressure relief elements and the sealing configuration. During hydraulic operation it is possible for differing hydraulic pressures to occur in the individual intermediate spaces, which are separated from each other by the pressure relief elements. The pressure difference between the neighboring intermediate spaces defines a pressure with which the associated pressure relief element is loaded. Each pressure relief element has at least one associated connecting channel for pressure relief of the neighboring low-pressure side intermediate space. Each connecting channel connects the low-pressure side intermediate space in which the hydraulic pressure $P_{ZN}$ is present with the neighboring high-pressure side intermediate space in which the hydraulic pressure $P_{ZH}$ is present or to the pressure $P_H$ at the high-pressure side. The connecting channel is closed when $P_{ZN} \leq P_{ZH}$ or $P_{ZN} \leq P_H$ whereby the pressure $P_{ZH}$ in the low pressure side intermediate space is less than or equal to the pressure $P_{ZH}$ in the high-pressure side intermediate space or the pressure $P_H$ on the high-pressure side. In this base pressure situation, the sealing ring seals the high pressure sided intermediate space or the high pressure side relative to the low pressure side intermediate space. The connecting channel in accordance with the invention remains closed in the event of an inverted pressure situation $P_{ZN} > P_{ZH}$ or $P_{ZN} > P_H$ in which the low pressure side intermediate space pressure is greater than the pressure on the high pressure side and in which the sealing ring on the low pressure sided intermediate space seals the intermediate space with respect to the high pressure intermediate space or with respect to the high pressure side. The connecting channel first opens when $P_{ZN} \geq P_{ZH} + P_{crit}$ or $P_{ZN} \geq P_H + P_{crit}$ in which pressure increase quantity $P_{crit}$ is equaled or exceeded. The pressure increase quantity $P_{crit}$ thereby represents a critical opening pressure for the connecting channel.

The pressure relief effected by the connecting channel is particularly advantageous when a plurality of pressure relief elements is arranged in series. During hydraulic operation, the hydraulic pressure in the intermediate spaces can increase to differing degrees. The pressure relief of one intermediate space depends solely on the pressure of a further i.e. a neighboring intermediate space on the high-pressure side. As soon as the pressure difference $P_{ZN} - P_{ZH}$ between the two neighboring intermediate spaces acting on the pressure relief element or $P_{ZN} - P_H$ between the intermediate space and the high pressure side reaches the corresponding associated pressure increase $P_{crit}$, $P_{ZN} - P_{ZH} = P_{crit}$ or $P_{ZH} - P_H = P_{crit}$, the associated connecting channel opens and a pressure equilibrium occurs between the associated coupled pressure regions or intermediate spaces. In this manner, the sealing system in accordance with the invention leads to the pressure relief of an intermediate space under all pressure conditions $P_{ZN} - P_{ZH} \geq P_{crit}$, even for intermediate pressures $P_{ZN}$, $P_{ZH} < P_H$ below the hydraulic operating pressure at the high pressure side.

In a preferred embodiment of the sealing system in accordance with the invention, at least one of the connecting channels is provided in the second sealing ring or in the second annular groove.

A connecting channel provided in the second sealing ring is advantageous with respect to closing and opening of the connecting channel, since both operating conditions are guaranteed in a secure manner through the seating of the sealing ring on groove surfaces of the corresponding second annular groove or on outer surfaces of the corresponding second preloading ring. The pressure relief element is disposed in the second annular groove in such a fashion that the sealing ring and the preloading ring are displaced towards the high pressure side during occurrence of an inverted pressure relationship $P_{ZH} > P_{ZH}$ or $P_{ZN} > P_H$. In this event, at least one of the openings of the connecting channel, normally the low pressure sided one, remains closed. Under a further increase in pressure, the preloading ring, the sealing ring or both rings are deformed until the pressure relief condition $P_{ZH} \leq P_{ZH} + P_{crit}$ or $P_{ZN} \geq P_H + P_{crit}$ is reached. The channel is then opened so that pressure medium can flow through the connecting channel from the low-pressure side intermediate space into the high-pressure side. The pressure increase quantity $P_{crit}$ thereby corresponds to the deformation force per unit area, which is required to free the connecting channel. The pressure medium located in the low pressure sided intermediate space flows through the connecting channel into the high pressure side intermediate space until achievement of the pressure condition $P_{ZN} - P_{ZH} < P_{crit}$ or $P_{ZN} - P_H < P_{crit}$ occurs in which the pressure difference acting on the pressure relief element namely, $P_{ZH} - P_{ZH}$ is below the pressure increase quantity $P_{crit}$ and the connecting channel is closed through a corresponding relief, expansion, or displacement of the preloading ring and/or the sealing ring. Following pressure relief, the pressure condition in the low-pressure intermediate space $P_{ZN} \approx (P_{ZH} + P_{crit})$ or $P_{ZN} \approx (P_H + P_{crit})$, which is below the high pressure, sided pressure plus the pressure increase quantity.

The configuration of the connecting channel in the second annular groove has the advantage that the sealing function of the second sealing ring is not encroached upon by the connecting channel in the installation region. The connecting channel provided in the second annular groove is closed by the second preloading ring or the second seal or by both and is first opened in the pressure relief configuration. In the event that the connecting channel or the connecting channels are configured in the annular groove, standardized sealing rings and preloading rings can be utilized which can usually be produced in a more economical fashion.

In order to guarantee an even pressure loading of the sealing ring during a pressure relief procedure, a plurality of connecting channels are preferentially provided in regular separations about the entire periphery of the sealing ring or of the annular groove. In this manner, the pressure medium which loads the sealing ring about its entire periphery is distributed equally towards the high pressure sided neighboring intermediate space to pass therein.

The connecting channel can be preferentially configured as a through hole, as a notch or a groove.

The closing and opening of the connecting channel defined as a through hole is guaranteed through opening and closing of corresponding outlets and inlets which can be achieved in accordance with the sealing system of the invention in a plurality of different and simple manners. The channel configured as a notch or groove can be provided in the second sealing ring or in the second annular groove, in particular, milled or machined therein. This has advantages with respect to the production of a sealing system in accordance with the invention as well as its components.

In a preferred configuration of the sealing system in accordance with the invention, the through hole is preferentially configured as a diagonal bore between a outer surface facing the bottom of the groove and a high pressure side surface or flank of the corresponding sealing ring.

The through hole connecting two neighboring intermediate spaces or one final intermediate space and the high pressure side to each other has at least one low pressure sided opening and one high pressure sided opening. A configuration of the low pressure sided opening on the bottom of the groove of the corresponding sealing ring outer surface facing the annular groove is preferably advantageous since, in this outer surface, the preloading ring seats on the sealing ring both in the fundamental basic pressure situation $P_{ZN} \leq P_{ZH}$ or $P_{ZN} \leq P_H$ as well as under pressure state $P_{ZN} > P_{ZH}$ or $P_{ZN} > P_H$ and thereby closes the opening. In the event of further pressure increase, the preloading ring is pressed onto the high pressure sided groove flank of the corresponding annular groove until it is deformed to the pressure relief condition $P_{ZN} \geq P_{ZH} + P_{crit}$ or $P_{ZH} \geq P_H + P_{crit}$ to such an extent that the low pressure sided opening is freed.

The connecting channel opens at the high pressure at a side surface or flank of the sealing ring and in such a fashion that the high pressure sided opening is freed at least in the pressure relief configuration. For this reason, the opening on the high-pressure side of the through hole is usually disposed proximate to an inner construction component at a usually slanted side surface. The outlet opening is frequently configured at the height of the sealing gap. The undesirable sealing of an opening outlet by a high pressure sided groove flank is avoided through the use of sealing rings having a stepped cross-sectional surface towards the high pressure side in that the high pressure sided opening outlet is provided on an inner surface or stepped surface which is separated from the inner component.

A configuration of the through hole as a diagonal bore has the advantage that direct medium pressure flow can be achieved during the pressure relief procedure and is economical and straight forward to produce.

An outward opening of the through hole is preferred along the axial direction of the outer surface.

The outlet opening on the low-pressure side is located on the outer surface, which serves as a seating surface for the preloading element. A change in pressure at the low-pressure side as well as at the high-pressure side intermediate spaces leads to a pressure dependent displacement and deformation of the elements disposed in the second annular groove. In the pressure configuration $P_{ZN} > P_{ZH}$ or $P_{ZN} > P_H$, the sealing ring is displaced along with its preloading tensioning ring in the axial direction towards the high-pressure side. The axial direction is defined by the motion axis of the translational motion of the inner component within the outer component. A further pressure increase on the low pressure side leads to deformation and/or compression of the preloading ring which is pressed onto the high pressure groove flank of the second annular groove and thereby successively opens the outer surface of the sealing ring located on the low pressure side. The further the opening on the outer surface is displaced towards the high-pressure side, the more pressure increase is required for opening the inlet. The axial position of the inlet opening at the low-pressure side thereby determines the critical opening pressure for the connecting channel and defines the associated pressure increase quantity $P_{crit}$. Through a choice of the axial position of the opening inlet of the through hole at the low pressure side, a particular opening pressure can be adjusted for each pressure released element. In the event of a plurality of through holes provided in a sealing ring, the opening inlets at the low pressure side are preferentially located in the same axial position, since any opening in the outer surface which is advanced relative to the other openings would be relieved before the others and would therefore lead to premature pressure relief.

The second sealing ring preferably has a notch or groove provided along the radial extent of the outer surface in which one opening inlet of the through hole is provided.

In this embodiment of the sealing system in accordance with the invention, the connecting channel leads into a notch at the low pressure side which extends in the radial direction along the outer surface of the sealing ring along the periphery or along part of the periphery of the sealing ring. Upon achievement of the pressure relief condition $P_{ZN} \geq P_{ZH} + P_{crit}$ or $P_{ZN} \geq P_H + P_{crit}$, the change in the orientation or configuration of the preloading ring leads to opening of the radial groove and of the connecting channel opening therein. This embodiment is particularly advantageous in the event of a plurality of connecting channels which are disposed about the periphery of the sealing ring and which open into the radial groove, since during relief of the radial groove, all connecting channels open at the same time and the pressure medium is evenly distributed about the connecting channels to flow into the next intermediate region at the high pressure side.

In a further advantageous configuration of the sealing system in accordance with the invention, the notch or groove is provided in an outer surface facing the bottom of the groove and in a high pressure sided flank of the corresponding sealing ring.

In the closed state, the connecting channel or groove of this kind is covered by the preloading ring seating on the outer surface and sealed with respect to the low pressure intermediate region. The groove or notch extends towards the high-pressure side along the outer surface and continues on the high-pressure side along the side surface of the sealing ring to open at a side edge of the sealing ring facing the inner construction component. The high pressure sided opening of the notch or groove is normally open both in the closed as well as in the open state of the connecting channel. In the event that the connecting channel is opened, the preloading ring is deformed in such a fashion that the low pressure side of the notch or groove is connected to the low pressure intermediate region so that pressurized fluid can flow through the entire notch or groove into the high pressure sided intermediate space.

The notch or groove is preferentially configured on the outer surface with differing lengths of a component directed in the axial direction.

The groove or notch extends on the outer surface in the axial direction or at an angle with respect to the axial direction. The axial position of the low pressure sided end of the notch or groove determines how far the preloading ring must be displaced towards the high pressure side i.e. which deformation or force is required in order to relief the low pressure sided end. In consequence thereof, the pressure increase quantity $P_{crit}$ is defined by the axial longitudinal component of the partial section of the groove or notch extending on the outer surface. The shorter the axial extent of this partial region, the greater is the critical opening pressure and the pressure increase quantity $P_{crit}$.

In a further preferred embodiment, the connecting channel is configured as a groove or a notch in the bottom of the groove and is provided in the second annular groove on a high pressure sided groove flank. Alternatively, the notch or groove can be configured in the high pressure sided groove flank as a connecting channel in the outer component.

The groove or notch provided in the installation space has the advantage that conventional sealing preloading rings can be utilized for pressure relief in accordance with the invention. The partial length of the connecting channel on the low-pressure side is configured on the bottom of the groove and in most embodiments is closed or opened by means of the preloading ring. The axial component of the length of the low pressure sided partial piece defines the axial position of the low pressure sided end of the connecting channel and consequently the required pressure increase quantity $P_{crit}$ which must be exceeded in order for relief to occur. The high pressure sided partial length extends along the high pressure sided groove flank and ends on the lower end of the groove flank or extends as a connecting channel through the outer component and ends on the inner surface of the outer component bordering the sealing gap between second annular groove and the neighboring second annular groove. The high pressure side outlet of the connecting channel is, in this embodiment, always open and the opening of the connecting channel is defined and controlled through opening and closing of the low pressure sided end.

The groove is preferentially a V-shaped groove or a rectangular shaped groove.

In a preferred embodiment, the sealing system in accordance with the invention has an additional annular groove disposed in the outer component facing the low pressure side which is opened towards the inner component and in which a wiping ring seating on the inner component and made from elastically deformable material is provided.

In hydraulic systems having high operating pressures, the sealing system in accordance with the invention provides for relief of the high-pressure loaded primary seal. In this configuration, the primary seal has an adjacent wiping ring disposed in an additional annular groove. With the assistance of the wiping ring, the inner component moving translationally within the outer component is cleaned during insertion. In this manner, introduction of dirt or foreign particles into the intermediate space of the sealing system is avoided, as is possible damaging of the sealing configuration and the pressure relief elements.

In a preferred configuration of the invention, at least one of the preloaded rings is an O-ring, a four-edge-ring, a Quad Ring® (registered mark of Quadion Corporation, Minneapolis, US) or a preformed part.

In the configuration of the pressure relief element, the seating surface between the preloading ring and the sealing ring and/or the seating surface between the sealing ring and the bottom of the groove is definitive for the closing and opening of the connecting channel in dependence on the embodiment of the configuration of that connecting channel. In the event of a four-edged-ring or a preformed part, these seating surfaces are flat, which guarantees sealing seating both between the two rings as well as between the ring and the installation space. An O-ring or a quad ring has advantages with respect to deformation during the increase of pressure since, in the installed state of the pressure relief element, free gap space occurs between the preloading ring and the annular groove in which the ring can be pressed into the pressure relief position.

In a further preferred embodiment of the sealing system in accordance with the invention, the outer component is a housing, in particular a cylinder and the inner component is a piston rod of a piston guided in the housing, wherein the annular grooves are either configured in the outer component or in the inner component.

Housing piston units are often hydraulic systems having high operating pressures. A configuration in accordance with the invention with regard to the pressure relief elements allows for pressure relief of such high-pressure systems in which the primary seal is highly loaded. Sealing configuration can be complemented by a wiping ring disposed in a further annular groove for cleaning the piston rod during insertion thereof.

In a preferred configuration of the sealing system in accordance with the invention, at least one of the two sealing rings has a sealing edge with a high pressure sided contact surface angle and a low pressure sided contact surface angle, wherein the high pressure sided contact surface angle is smaller or equal to the low pressure sided contact surface angle.

For the sealing mechanism, the preloading and the contact pressure dependence of the dynamic seal is of fundamental importance. The preloading is produced during installation of the inner component into the outer component. The contact pressure dependence corresponds to that of a pressurized fluid loading of the surface of the sealing ring as transferred to the sealing surface. The leak rate is determined from the difference between the oil film, which is removed to the oil film that is introduced. The hydrodynamic leakage rate is determined by the pressure gradients in the contact region up to the high-pressure side. The pressure gradient depends on the contact surface angles between the sealing edge and the inner component to be sealed. A high pressure sided steeper contact surface angle leads to a steeper pressure gradient and a lower leakage rate whereas a high pressure sided flatter contact surface angle leads to a flatter pressure gradient and a higher leakage rate.

As long as the return transport capability of the sealing system is greater than or equal to the amount of oil, which is transported out, one talks of a sealed system. Towards this end, the first ring of the sealing configuration disposed in the first annular groove, which serves in accordance with the invention as a primary seal, has a steep pressure gradient. Leak rates are allowed in a controlled manner to occur on the pressure relief element in that the sealing edge of a corresponding sealing ring has symmetric or asymmetric contact surface angles with smaller contact surface angles on the high pressure side than on the low pressure side and in consequence thereof, a flat pressure gradient.

Moreover, at least one of the sealing surfaces is preferentially rounded.

The rounding of a sealing edge can lead to a change in the so called drag angle between the sealing ring and the moving inner component for definition of a particular leak rate in the pressurized state and can be adjusted to the requirements of the system.

The invention also includes use of a sealing system in accordance with the invention in order to adjust an intermediate space pressure cascade, wherein the high pressure sided and low pressured sided contact surface angles are chose in such a fashion that, in the pressurized state and in the event of a back and forth motion of the inner component within the outer component, a leakage rate appropriate for each sealing ring is defined by means of which the hydraulic pressure in and on the corresponding pressure relief element at the neighboring low pressure side intermediate space is adjusted.

By means of the contact surface angle, the high dynamic leakage of each pressure relief element is adjusted in such a fashion that a particular hydraulic pressure is present in each intermediate space. In this manner, in the sealing system in accordance with the invention, defined intermediate pressures are adjusted which, in a preferred embodiment, decrease in a cascading fashion from the high-pressure side to the low-pressure side. Each pressure relief element constitutes a pressure step in the sealing configuration, the amount of which corresponds to the pressure difference in the corresponding element. In addition to the high dynamic return transport capability of the sealing rings, the sealing system in accordance with the invention also has a hydrostatic relief capability due to the connecting channels provided in the pressure relieved element. The valve function of the connecting channels leads to a pressure relief of an intermediate space in the event of an increase in the intermediate space pressure above the intermediate space pressure of the high pressure sided neighboring intermediate space plus the corresponding pressure increase quantity.

In the event of a proper optimization of the individual elements of the sealing system in accordance with the invention, the system or working pressure in a hydraulic system can be increased without encroaching on the function or lifetime of the pressure system. By means of a defined pressure behind a pressure relief element even the lubricant film formation in the sealing gap of a sealing system can be improved which positively influences the friction and the lifetime of the overall system. This optimal condition is achieved through the adjustment of the opening pressure of the pressure release of the pressure relief element i.e. the pressure increase quantity. The opening outlet at the low pressure side i.e. the end of the connecting channel at the low pressure side is disposed on the inner outer diameter on the second sealing ring or of the second preloading ring or in the second ring groove in axially differing manners so that the pressure dependent displacement of the pressure relief elements relative to each other lead to high or lower opening pressures, which can be adjusted.

Through the cooperative interaction between the high dynamic transport capability and the hydrostatic relief, a long operating time with improved or no leakage in the outer direction can be achieved under advantageous operating conditions using a sealing system having e.g. a pressure seal with a relief channel and an associated neighboring secondary seal.

In a further preferred application of the sealing system in accordance with the invention for adjustment of the intermediate pressure cascade, the hydraulic pressures in the intermediate regions are adjusted in such a fashion that an equal pressure difference occurs on each second sealing ring.

The advantage of an application of the inventive sealing system of this kind is that all pressure relief elements contribute in an equal fashion to the pressure relief of the highly pressurized primary seal. The individual components of an equal stepped intermediate space pressure cascade are thereby loaded to an equal extent as a result of which the lifetime in the overall sealing system is increased.

Further advantages of the invention can be extracted from the description and the figures. The sealing system in accordance with the invention is represented in its totality as well as in components in the embodiments of FIGS. 1 through 4. The embodiments shown in the figures are highly schematic and not to scale.

DESCRIPTION OF THE PREFERRED EMBODIMENT

Figure 1:
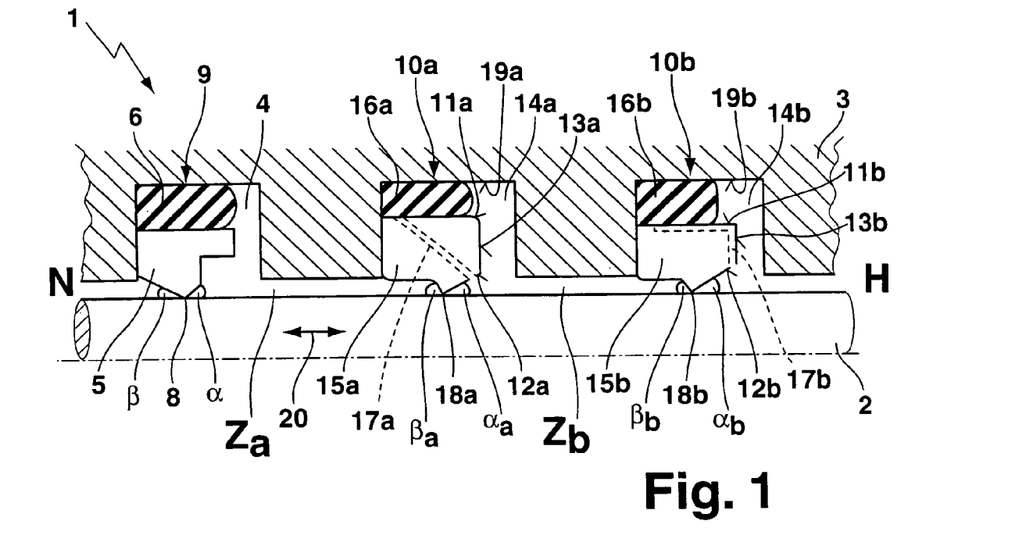
FIG. 1 shows a cross-section through an exemplary sealing system with a fundamental pressure situation.

FIG. 1 shows a sealing system 1 in accordance with the invention between two neighboring moving components for sealing of a high-pressure side H with respect to a low pressure N. An inner component 2 is disposed within an outer component 3 in such a fashion that a translational motion can be carried out in axial direction 20. The outer component 3 is a cylindrical housing and the inner component 2 is a piston rod of a piston guided within the housing. An exchange of the inner 2 and the outer components 3 is also conceivable, for example, configuration of the outer component 3 as a piston and the inner component 2 as a tube. FIG. 1 shows the upper half space of the sealing system 1 in a longitudinal cut.

The outer component 3 has a total of three annular grooves, which open towards the inner component 2. A first annular groove 4 facing a low pressure side N and second annular grooves 14a and 14b facing the high-pressure side H. The sealing configuration 9 is disposed in the first annular groove 4 having a first sealing ring 5 seating on an inner component 2 made from an elastically deformable material as well as surrounding first preloading ring 6 which radially loads the sealing ring 5 and seals the ring groove 4, made from an elastically deformable material. The first preloading ring 6 is configured as an O-ring made from an elastomer. The sealing configuration serves as a primary seal and therefore sealing edge 8 of the first sealing ring has a steep pressure gradient. The steep pressure gradient and the associated low leak rate depend on the high pressure sided contact surface angle α and the low pressure sided contact surface angle β between the first sealing ring 5 and the inner component 2, wherein the high pressure sided contact surface angle α is greater than the low pressure sided contact surface angle β.

A first pressure relief element 10a is provided in the second annular groove 14a and an additional pressure relief element 10b is provided in the additional second annular groove 14b. The pressure relief elements 10a and 10b each comprise a second sealing ring 15a and 15b seating on the inner component 2 made from an elastically deformable material and a corresponding second preloading ring 16a and 16b made from an elastically deformable material and radially loading the corresponding sealing ring 15a and 15b to seal the corresponding second ring groove 14a and 14b. The second preloading ring 16a on the first pressure relief element 10a is an O-ring and the second preloading ring 16b is a preformed part. The second sealing rings 15a and 15b seat on the inner component 2 with sealing edges 18a and 18b wherein corresponding high pressure sided contact surface angles $\alpha_a$ and $\alpha_b$ are each smaller than a corresponding low pressure sided contact surface angle $\beta_a$, $\beta_b$. The resulting surface pressure gradients can also be achieved through symmetric i.e. equal contact surface angles at one sealing edge. Moreover, the drag dependence can be influenced through a rounding of the sealing edge.

The series configuration in the sealing configuration 9 of the first pressure relief element 10a and the additional pressure relief element 10b, define a first intermediate space $Z_a$ between the sealing configuration 9 and the first pressure relief element 10a and a second intermediate space $Z_b$ between the first pressure relief element 10a and the additional pressure relief element 10b. Surface pressure gradients on the sealing edges 18a and 18b can be used to define a certain leakage for the pressure relief elements 10a and 10b in the pressurized state and during translational motion of the inner component 2 in the outer component 3. The associated leakage rate determines the hydraulic pressure at the low-pressure side in the intermediate space bordering the pressure relief element: for the first pressure relief element 10a, the pressure $P_{Za}$ in the first intermediate space $Z_a$ and with additional pressure relief elements 10b, the pressure $P_{ZB}$ in the additional intermediate space $Z_b$. The intermediate space pressures $P_{ZA}$ and $P_{ZB}$ are adjusted in such a fashion that a stepwise increase of pressure $P_N$ from the low pressure side to the pressure $P_H$ on the high pressure side occurs in the sealing system: $P_N < P_{ZA} < P_{ZB} < P_H$. The choice of certain intermediate space pressures $P_{ZA}$ and $P_{ZB}$ permit the adjustment of an equal stepped pressure cascade with which the sealing configuration 9 as well as both pressure relief elements 10a and 10b, in particular, the first sealing ring 5 and the second sealing rings 15a and 15b can be loaded with an equal pressure difference $P_{ZA} - P_N = P_{ZB} - P_{ZA} = P_H - P_{ZB}$. FIG. 1 shows the fundamental pressure configuration $P_N < P_{ZA} < P_{ZB} < P_H$ in an intermediate space cascade. The low-pressure side of the sealing configuration 9 seats on the first annular groove 4 and thereby seals the first intermediate space $Z_a$ with respect to the low-pressure side N.

The second sealing ring 15a of the first pressure relief element 10a has a through hole 17a which serves as a connecting channel between the first intermediate space $Z_a$ and an additional intermediate space $Z_b$. The through hole 17a is a diagonal bore between an outer surface 11a facing the bottom of the groove 19a and a side surface 12a of the second sealing ring 15a facing the high pressure side. To effect the high pressure side of an outlet opening of the through hole 17a, the slanted side surface 12a of a side flank 13a is preferred, since the side surface 12a proximate to the inner component 2 does not seat on the second annular groove 14a in the inverted pressure configuration $P_{ZA} > P_{ZB}$. The low pressure sided outlet opening of the through hole 17a is displaced with respect to the high-pressure side H in the axial direction 20 of the outer surface 11a. The second sealing ring 15a can have an additional groove or notch disposed along the radial extent of the outer surface 11a to accept the outlet opening at the low pressure side of all through holes provided in the second sealing ring 15a. In the basic pressure situation $P_{ZA} < P_{ZB}$ the pressure relief element 10a at the low pressure side seats on the second annular groove 14a and the through hole 17a is closed by the second preloading ring 16a seating on the outer surface 11a.

The second sealing ring 15b of the additional pressure relief element 10b has an outer surface 11b facing the groove bottom 19b of the second annular groove 14b as well as a notch 17b which extends in a high pressure side flank 13b by means of which the additional intermediate chamber $Z_b$ and the high pressure side H can be connected to each other. The notch 17b can be a groove. The longitudinal component in the axial direction 20 of the partial extent of the notch 17b extending in the outer surface 11b is less than the overall length of the outer surface 11b as a result of which, the low pressure sided end of the notch is displaced towards the high pressure side H. In the basic pressure situation shown $P_{Zb} < P_H$ the second sealing ring 15b and the second preloading ring 16a of the additional pressure relief element 10b seat on a low pressure sided groove flank of the second annular groove 14b, wherein the second preloading ring 14b closes the low pressure sided end of the notch 17b by means of a wide area seating on the outer surface 11b. The high-pressure end of the notch 17b feeds into the edge of a slanted side surface 12b and is open.

Figure 2:
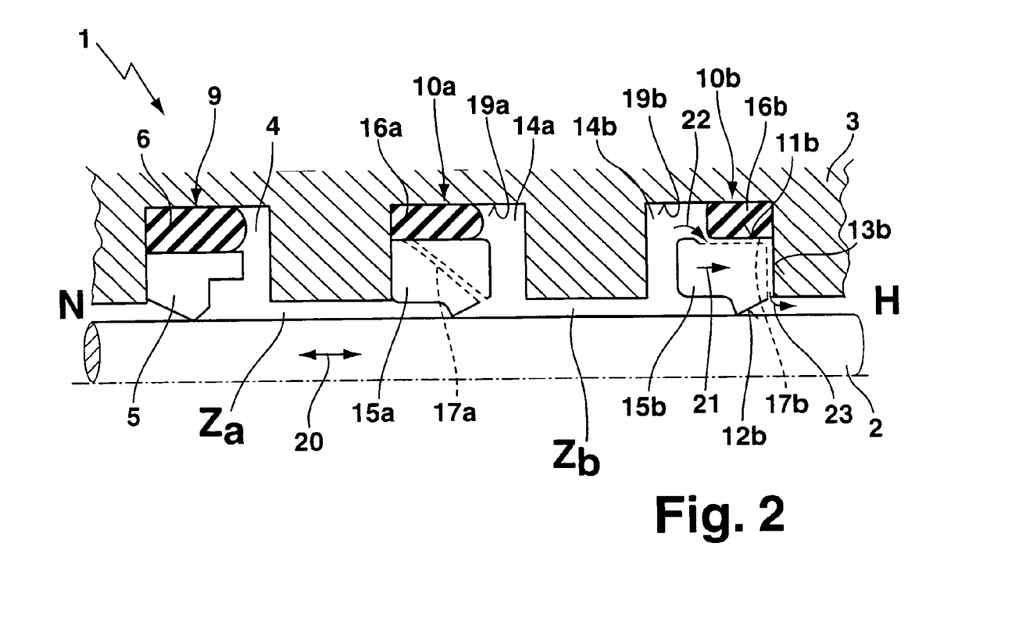
FIG. 2 shows a cut through an exemplary sealing system of FIG. 1 in a pressure relief configuration.

FIG. 2 show how the position of the individual elements of FIG. 1 of the sealing system 1 in accordance with FIG. 1 changes under the occurrence of a pressure relief configuration $P_{Zb} \geq P_H + P_{crit}$. In this pressure relief configuration, the pressure $P_{Zb}$ in the additional intermediate space $Z_b$ exceeds the pressure $P_H$ on the high pressure sided as a result of which the additional pressure relief element 10b is pushed towards the high pressure side H in the direction 21, and in consequence thereof, against a flank on a second annular groove 14b at which it seats at the high pressure side. In response to an additional increase in additional space pressure $P_{Zb}$, the second preloading ring 16b is activated and experiences an additional displacement towards the high pressure sided groove flank of the second annular groove 14b. In response to this motion of the second preloading ring, 16b the notch 17b in the pressure relief situation $P_{Zb} \geq P_H + P_{crit}$ is opened and the pressure medium located in intermediate space $Z_b$ flows in the direction 22 through the notch 17b and gains entrance in direction 23 to the high pressure side H. This pressure relief of the additional intermediate space $Z_b$ occurs up to the point at which the low pressure sided overpressure no longer exceeds the pressure increase quantity $P_{crit}$, $P_{Zb} - P_H < P_{crit}$, and the second preloading ring 16b is no longer sufficiently deformed in the direction towards the high pressure side so that the low pressure sided end of the notch 17b is once more closed by the seating of the preloading ring 17b on the outer surface 11b.

Both the position of the sealing configuration 9 as well as the position of the first pressure relief element 10a remain unchanged in a pressure condition $P_{Zb} > P_H$ as well as in the pressure relief position $P_{Zb} \geq P_H + P_{crit}$, since the condition $P_N < P_{Za} < P_{Zb}$ continues to obtain. The pressure relief of the additional intermediate space $Z_b$ thereby has no effect on the sealing configuration 9, which emphasizes the effectiveness and advantages of a multi-step pressure cascade for the pressure relief of the primary seal.

Figure 3:
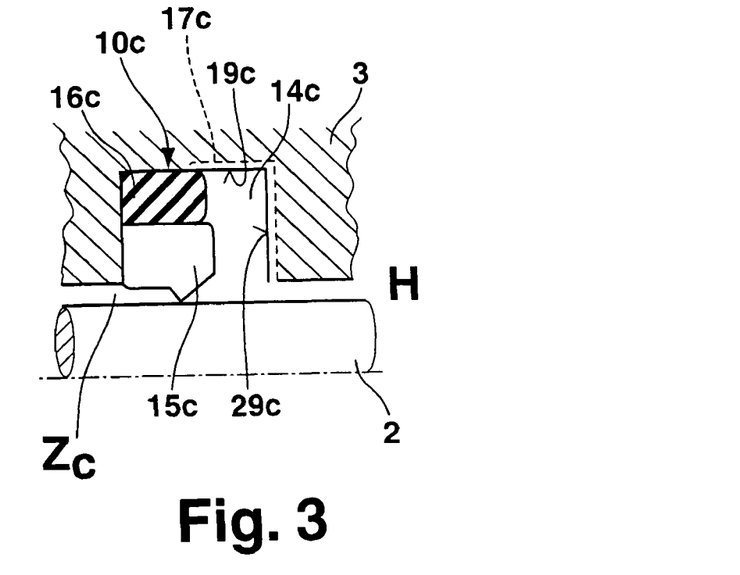
FIG. 3 shows a cut through an exemplary pressure relief element of a sealing system in accordance with the invention.

FIG. 3 shows a cut through an exemplary pressure relief element of a sealing system in accordance with the invention. A pressure relief element 10c is disposed in a second annular groove 14c fashioned in the outer component 3, the element 10c comprising a second sealing ring 15c seating on the inner component 2 as well as a preloading ring 16c. The pressure relief element 10c has an associated connecting channel, which is configured as a groove 17c in the installation region disposed in the second annular groove 14c. The groove 17c is a rectangular groove and runs in the groove bottom 19c as well as in a groove side 29c at the high-pressure side of the second annular groove 14c. In the basic configuration shown, the pressure relief element 10c seals the high pressure side H with respect to an intermediate space 16c bordering the low pressure side and the groove 17c, serving as a pressure release channel, is sealed by the second preloading ring 16c.

Figure 4:
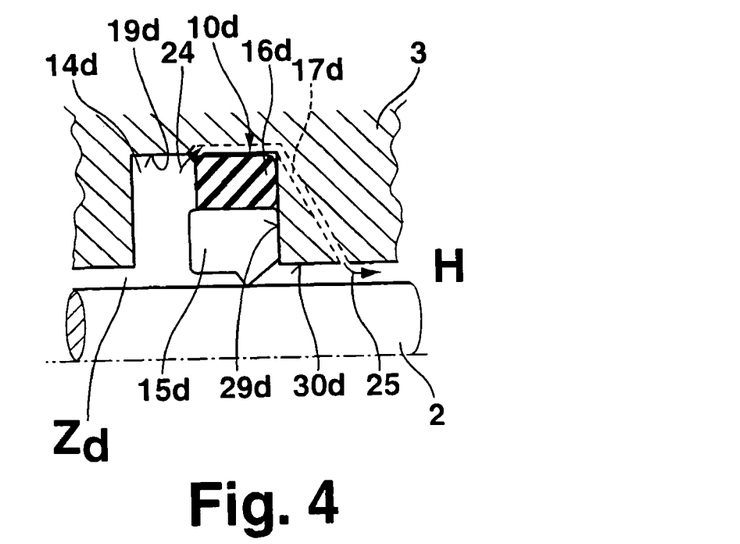
FIG. 4 shows a cut through an additional example of a pressure relief element of a sealing system in accordance with the invention.

FIG. 4 shows a cut through an additional example of a pressure relief element of a sealing system in accordance with the invention. An annular groove 14d is provided in the outer component 3 and contains a pressure relief element 10d comprising a second sealing ring 15d seating on the inner component and a second preloading ring 16d. The pressure relief element 10d has an associated connecting channel 17d, which is provided, in the installation space in the second annular groove 14d and in the outer component 3. The connecting channel 17d is figured in the groove bottom 19d of the second annular groove 14d in the form of the notch or groove and extends past a high pressured sided groove flank 29d, in the form of a through hole in the outer component 3. FIG. 4 shows a pressure relief configuration in which the second sealing ring 15d and a second preloading ring 16d seat on the high pressure sided groove flank 29d of the second annular groove 14d. The pressure related deformation of a second preloading ring 16d causes the low pressure sided opening of the connecting channel 17d fashioned in the groove bottom 19b to open so that hydraulic liquid can flow from the low pressure side in intermediate volume or region $Z_d$ in the direction of arrow 24 through the connecting channel 17d to gain entrance to the inner surface 30d of the outer component 3 in the direction of arrow 25 at the high pressure side H at a sealing gap between the inner and outer components 2 and 3.

A sealing system between two mutually moving components for sealing a high pressure side with respect to a low pressure side has a sealing configuration disposed in a first annular groove having one or more pressure relief elements disposed in a second annular groove. The pressure relief elements each have a second sealing ring with a flat pressing gradient. The high dynamic leak rate for each of the pressure relief elements is adjusted in such a fashion that a particular hydraulic pressure is present in each intermediate space and such that an intermediate space pressure cascade is fashioned. In addition to the high dynamic transport capability of the sealing ring, the sealing system in accordance with the invention has a hydrostatic relief option by means of which connecting channels adjacent to or fashioned in the pressure relief element act as check valves for pressure relief of an intermediate volume in response to an increase of the pressure in the intermediate volume beyond the intermediate volume pressure of the neighboring intermediate volume on the high pressure side plus a corresponding pressure release quantity.

I claim:

1. A sealing system between two mutually moving components for sealing a high pressure side with respect to a low pressure side, wherein an outer component has a sealing configuration annular groove opening towards an inner component and facing the low pressure side and a first annular groove opening towards the inner component and facing the high pressure side, the sealing system comprising:
- a sealing configuration disposed in the sealing configuration annular groove, said sealing configuration having a sealing configuration sealing ring seating on the inner component and made from an elastically deformable material as well as a sealing configuration preloading ring radially surrounding said sealing configuration sealing ring and sealing the sealing configuration annular groove, the sealing configuration preloading ring made from an elastically deformable material; and
- a first pressure relief element disposed in the first annular groove, said first pressure relief element having a first sealing ring seating on the inner component and made from an elastically deformable material as well as a first preloading ring radially surrounding said first sealing ring and sealing the first angular groove, said first preloading ring made from an elastically deformable material, wherein said first pressure relief element has at least one first connecting channel associated therewith by means of which a first intermediate space, disposed between said sealing configuration and said first pressure relief element, is connected to the high pressure side, wherein each said first connecting channel is closed in a pressure configuration $P_{ZA} < P_H$ and is open in a pressure relief configuration $P_{ZA} \geq P_H + P_{Acrit}$, wherein $P_H$ is the hydraulic pressure on the high pressure side, $P_{ZA}$ the hydraulic pressure in said first intermediate space and $P_{Acrit}$ a pressure increase quantity which, when exceeded, leads to opening of said first connecting channel, wherein $P_{Acrit}$ is defined by deformation of said first preloading ring in an axial direction.

2. The sealing system of claim 1, wherein at least one of said first connecting channels is provided in said first sealing ring or in the first annular groove.

3. The sealing system of claim 2, wherein said first connecting channel is a through hole, a notch, or a groove.

4. The sealing system of claim 3, wherein said through hole is a diagonal through hole disposed between an outer surface facing a bottom of the first annular groove and a high pressure sided surface or flank of said first sealing ring.

5. The sealing system of claim 4, wherein one opening outlet of said through hole is disposed along an axial extent of said outer surface.

6. The sealing system of claim 4, wherein said first sealing ring has a notch or groove disposed along a radial extension of an outer surface in which an outlet opening of said through hole is provided.

7. The sealing system of claim 3, wherein said notch or groove is provided in an outer surface facing a bottom of the first annular groove and in a high pressure side flank of said first sealing ring.

8. The sealing system of claim 3, wherein first connecting channel is a V-shaped groove or a rectangular-shaped groove.

9. The sealing system of claim 2, wherein said first connecting channel is a groove or notch in a bottom of the first groove and in a high pressure sided groove flank of a the first annular groove or said notch or groove is formed in a high pressure sided annular groove flank in the form of a through hole in the outer component.

10. The sealing system of claim 1, wherein an additional annular groove is provided in the outer component facing the low pressure side which is opened towards the inner component and which has a wiping ring seating on the inner component and made from an elastically deformable material.

11. The sealing system of claim 1, wherein said first preloading ring is an O-ring, a four-edged-ring, a Quad-Ring®, or a preformed part.

12. The sealing system of claim 1, further comprising a second pressure relief element disposed in a second annular groove located between said sealing configuration and said first pressure relief element, said second pressure relief element having a second sealing ring seating on the inner component and made from an elastically deformable material as well as a second preloading ring radially surrounding said second sealing ring and sealing the second angular groove, said second preloading ring made from an elastically deformable material, wherein said second pressure relief element has at least one second connecting channel associated therewith by means of which a second intermediate space, disposed between said sealing configuration and said second pressure relief element, is connected to said first intermediate space, wherein each said second connecting channel is closed in a pressure configuration $P_{ZB} < P_{ZA}$ and is open in a pressure relief configuration $P_{ZB} \geq P_{ZA} + P_{Bcrit}$, wherein $P_{ZB}$ is the hydraulic pressure in said second intermediate space and $P_{Bcrit}$ a pressure increase quantity which, when exceeded, leads to opening of said second connecting channel, wherein $P_{Bcrit}$ is defined by deformation of said second preloading ring in an axial direction.

13. A sealing system between two mutually moving components for sealing a high pressure side with respect to a low pressure side, wherein an outer component has a sealing configuration annular groove opening towards an inner component and facing the low pressure side and a first annular groove opening towards the inner component and facing the high pressure side, the sealing system comprising:
- a sealing configuration disposed in the sealing configuration annular groove, said sealing configuration having a sealing configuration sealing ring seating on the inner component and made from an elastically deformable material as well as a sealing configuration preloading ring radially surrounding said sealing configuration sealing ring and sealing the sealing configuration annular groove, the seating configuration preloading ring made from an elastically deformable material; and
- a first pressure relief element disposed in the first annular groove, said first pressure relief element having a first sealing ring seating on the inner component and made from an elastically deformable material as well as a first preloading ring radially surrounding said first sealing ring and sealing the first angular groove, said first preloading ring made from an elastically deformable material, wherein said first pressure relief element has at least one first connecting channel associated therewith by means of which a first intermediate space, disposed between said sealing configuration and said first pressure relief element, is connected to the high pressure side, wherein each said first connecting channel is closed in a pressure configuration $P_{ZA} < P_H$ and is open in a pressure relief configuration $P_{ZA} \geq P_H + P_{Acrit}$, wherein $P_H$ is the hydraulic pressure on the high pressure side, $P_{ZA}$ the hydraulic pressure in said first intermediate space and $P_{Acrit}$ a pressure increase quantity which, when exceeded, leads to opening of said first connecting channel, wherein said first sealing ring has a first sealing edge having a first high pressure contact surface angle facing the high pressure side and a first low pressure contact surface angle facing the first intermediate space, wherein said first high pressure contact surface angle is smaller than or equal to said first low pressure contact surface angle.

14. The sealing system of claim 13, wherein said first sealing edge is rounded.

15. The sealing system of claim 13, further comprising a second pressure relief element disposed in a second annular groove located between said sealing configuration and said first pressure relief element, said second pressure relief element having a second sealing ring seating on the inner component and made from an elastically deformable material as well as a second preloading ring radially surrounding said second sealing ring and sealing the second angular groove, said second preloading ring made from an elastically deformable material, wherein said second pressure relief element has at least one second connecting channel associated therewith by means of which a second intermediate space, disposed between said sealing configuration and said second pressure relief element, is connected to said first intermediate space, wherein each said second connecting channel is closed in a pressure configuration $P_{ZB} < P_{ZA}$ and is open in a pressure relief configuration $P_{ZB} \geq P_{ZA} + P_{Bcrit}$, wherein $P_{ZB}$ is the hydraulic pressure in said second intermediate space and $P_{Bcrit}$ a pressure increase quantity which, when exceeded, leads to opening of said second connecting channel, wherein said second sealing ring has a second sealing edge having a second high pressure contact surface angle facing said first intermediate space and a second low pressure contact surface angle facing said second intermediate space, wherein said second high pressure contact surface angle is smaller than or equal to said second low pressure contact surface angle.

16. The sealing system of claim 15, wherein said first high pressure and said first low pressure contact surface angles are structured to define, in a pressure applied state and during back and forth motion of the inner component in the outer component, a leakage rate for said first sealing ring by means of which a hydraulic pressure in said first intermediate space is adjusted.

17. The sealing system of claim 16, wherein a hydraulic pressure between said first and said second intermediate regions is adjusted in such a fashion that a same pressure difference obtains between successive sealing rings.

* * * * *